US012185067B2

(12) United States Patent
Jensen et al.

(10) Patent No.: US 12,185,067 B2
(45) Date of Patent: Dec. 31, 2024

(54) SPEAKER CONTROL

(71) Applicant: Apple Inc., Cupertino, CA (US)

(72) Inventors: Thomas M. Jensen, San Francisco, CA (US); Andrew P. Bright, Los Gatos, CA (US); Ariel A. Massias, San Francisco, CA (US); Ethan R. Duni, San Mateo, CA (US); Hannes Breitschaedel, Vienna (AT); Max Rasmussen, Frederiksvaerk (DK)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 17/750,271

(22) Filed: May 20, 2022

(65) Prior Publication Data

US 2023/0379624 A1 Nov. 23, 2023

(51) Int. Cl.
*H04R 3/00* (2006.01)
*H04R 29/00* (2006.01)

(52) U.S. Cl.
CPC ........... *H04R 3/007* (2013.01); *H04R 29/001* (2013.01)

(58) Field of Classification Search
CPC .............................. H04R 3/007; H04R 29/001
USPC ............. 381/55, 58, 59, 120; 330/2; 73/647, 73/646, 645; 714/47.1
See application file for complete search history.

(56) References Cited

U.S. PATENT DOCUMENTS

| | | | | |
|---|---|---|---|---|
| 10,848,859 | B1 | 11/2020 | Breitscchaedel et al. | |
| 2011/0228945 | A1 * | 9/2011 | Mihelich .............. | H04R 29/001 381/59 |
| 2016/0157015 | A1 | 6/2016 | Van Schyndel | |
| 2018/0136899 | A1 | 5/2018 | Risberg et al. | |
| 2019/0068152 | A1 * | 2/2019 | Gautama .................. | H04R 3/04 |

* cited by examiner

*Primary Examiner* — Vivian C Chin
*Assistant Examiner* — Con P Tran
(74) *Attorney, Agent, or Firm* — BAKERHOSTETLER

(57) ABSTRACT

Aspects of the subject technology relate to electronic devices having speakers. An electronic device may include speaker control circuitry for a speaker. The speaker control circuitry may include multiple parallel prediction blocks that share a single look-ahead delay, and that feed, in parallel, a single controller. The single controller can generate a joint modification to an audio signal based on the parallel outputs of the prediction blocks. The joint modification can then be applied to the audio signal to generate a speaker-protection audio signal that can be output by the speaker. The speaker control circuitry may also include a system modeler that models the speaker system of the electronic device based on feedback measured physical characteristics. In this way, a reduced control safety margin can be achieved by more accurate model predictors, which can allow the controller to safely drive the speaker system to its full capability.

19 Claims, 4 Drawing Sheets

SPEAKER CONTROL

TECHNICAL FIELD

The present description relates generally to acoustic devices including, for example, speaker control.

BACKGROUND

Speaker control systems often place operational limits on the operation of a speaker, to within an operational range that is less than a full range of capabilities of the speaker, for preventing damage to the speaker.

BRIEF DESCRIPTION OF THE DRAWINGS

Certain features of the subject technology are set forth in the appended claims.

However, for purpose of explanation, several aspects of the subject technology are set forth in the following figures.

DETAILED DESCRIPTION

Figure 1:
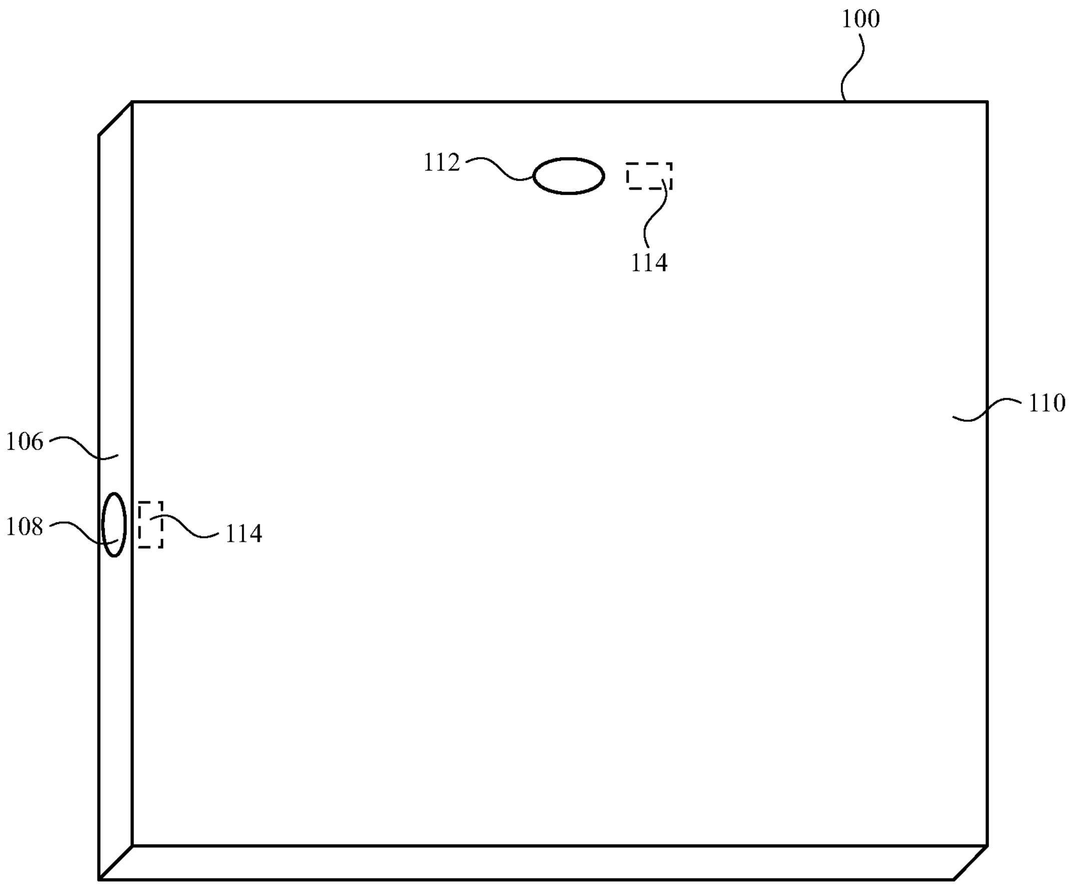
FIG. 1 illustrates a perspective view of an example electronic device having a speaker in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Speaker control systems may be provided for speaker systems. Speaker control systems may operate a speaker system according to operational goals such as monitoring speaker performance, enabling usage of the speaker system within the full range of the capabilities of the speaker system (e.g., the full range of an amplifier and/or a loudspeaker), protecting the speaker system against long term and short term damage through control of the audio signal that is sent through the speaker system, and/or applying dynamic signal processing of the audio signal for mitigation purposes while maintaining subjective audio quality.

However, challenges can arise when implementing such speaker control systems. For example, methods for loudspeaker control are typically implemented in a serialized manner, in which different areas of speaker control are performed in series, one after the other. In these serialized speaker control systems, the speaker control systems operate with limited (or no) exchange of information between control and mitigation blocks, resulting in a system in which each mitigation block operates independently of each other mitigation block, and in which additional dynamics can be added to the audio signal processing for each control and mitigation block. These serialized speaker control systems can have disadvantages, such as requiring additional considerations and/or processing by algorithmic tuners to achieve objectives of controlling the loudspeaker system while maintaining subjective audio quality of the combined processed audio signal. Additionally, in these serialized speaker control systems, for each control and mitigation block, a look-ahead delay can be provided in the signal processing chain to allow time for control processes to operate. This typically results in a series of control and mitigation blocks, each adding a corresponding look-ahead delay that combine, in series, to lead to longer than desired audio processing delays.

In addition, speaker control systems can rely on prediction models in the areas in which control is to be provided, such areas including (as examples) diaphragm displacement, voice coil temperature, etc. Inadequate physical model predictors are often a source of additional challenges for loudspeaker control algorithms. For example, time-invariant prediction models that are not aware of the current operational state of the speaker system cannot adequately model the time varying changes of the speaker system, such as power compression and loss of acoustic sensitivity. For this reason, time-invariant prediction models are often tuned for a worst case scenario operating condition, which can have the undesired effect of providing unnecessary and/or unused safety margin, and overprotection of the speaker system under many, if not most, operating conditions. Time-invariant prediction models may also fail to adequately capture part-to-part variations resulting from the manufacturing process for speaker systems and/or devices in which speaker systems are implemented which, in the case of tuning a prediction model for worst case scenario, can also lead to additional unnecessary safety margin and overprotection of the speaker system.

In accordance with aspects of the subject technology, speaker systems are provided that include speaker control circuitry that addresses these and other challenges in implementing speaker systems. For example, in one or more implementations, speaker control circuitry may include individual prediction models (e.g., for each of one or more areas of loudspeaker control) in a sidechain and operating in parallel, allowing the prediction models to share a single look-ahead delay. In one or more implementations, one single controller and one single mitigation block are provided for all loudspeaker control areas, instead of a series of individual control and mitigation blocks for each loudspeaker control area.

In one or more implementations, a system modeler is provided that uses measured physical characteristics of the speaker system and/or the device in which the speaker system is implemented (e.g., one or more voltages, currents, and/or mechanical motions or displacements) to model the physical speaker system and/or device in real time. The system modeler can provide model parameters to the individual prediction models in real time. In this way, the speaker system can be operated with a reduced control safety margin that allows the controller to safely drive the loudspeaker system to its maximum capability. This reduced control safety margin may be achieved by generating and using more accurate model predictors that are enabled by the system modeler, in one or more implementations.

An illustrative electronic device including a speaker with a speaker control system is shown in FIG. 1. In the example of FIG. 1, electronic device 100 has been implemented using a housing that is sufficiently small to be portable and carried or worn by a user (e.g., electronic device 100 of FIG. 1 may be a handheld electronic device such as a tablet computer or a cellular telephone or smart phone or a wearable device such as a smart watch, a pendant device, a headlamp device, or the link). In the example of FIG. 1, electronic device 100 includes a display such as display 110 mounted on the front of a housing 106. Electronic device 100 may include one or more input/output devices such as a touch screen incorporated into display 110, a button, a switch, a dial, a crown, and/or other input output components disposed on or behind display 110 or on or behind other portions of housing 106. Display 110 and/or housing 106 may include one or more openings to accommodate a button, a speaker, a light source, or a camera (as examples).

In the example of FIG. 1, housing 106 includes an opening 108. For example, opening 108 may form a port for an audio component. In the example of FIG. 1, the opening 108 forms a speaker port for a speaker 114 disposed within the housing 106. In this example, the speaker 114 is aligned with the opening 108 to project sound through the opening 108. In other implementations, the speaker 114 may be offset from the opening 108, and sound from the speaker may be routed to and through the opening 108 by one or more internal device structures (as discussed in further detail hereinafter).

In the example of FIG. 1, display 110 also includes an opening 112. For example, opening 112 may form a port for an audio component. In the example of FIG. 1, the opening 112 forms a speaker port for a speaker 114 disposed within the housing 106 and behind a portion of the display 110. In this example, the speaker 114 is offset from the opening 112, and sound from the speaker may be routed to and through the opening 112 by one or more device structures. In other implementations, the speaker 114 may be aligned with a corresponding opening 108 or opening 112.

In various implementations, the housing 106 and/or the display 110 may also include other openings, such as openings for one or more microphones, one or more pressure sensors, one or more light sources, or other components that receive or provide signals from or to the environment external to the housing 106. Openings such as opening 108 and/or opening 112 may be open ports or may be completely or partially covered with a permeable membrane or a mesh structure that allows air and/or sound to pass through the openings. Although two openings (e.g., opening 108 and opening 112) are shown in FIG. 1, this is merely illustrative. One opening 108, two openings 108, or more than two openings 108 may be provided on the one or more sidewalls of the housing 106, on a rear surface of housing 106 and/or a front surface of housing 106. One opening 112, two openings 112, or more than two openings 112 may be provided in the display 110. In some implementations, one or more groups of openings in housing 106 and/or groups of openings 112 in display 110 may be aligned with a single port of an audio component within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a media player, a gaming device, a navigation device, a computer monitor, a television, a headphone, an earbud, or other electronic equipment. In some implementations, electronic device 100 may be provided in the form of a wearable device such as a smart watch. In one or more implementations, housing 106 may include one or more interfaces for mechanically coupling housing 106 to a strap or other structure for securing housing 106 to a wearer.

Figure 2:
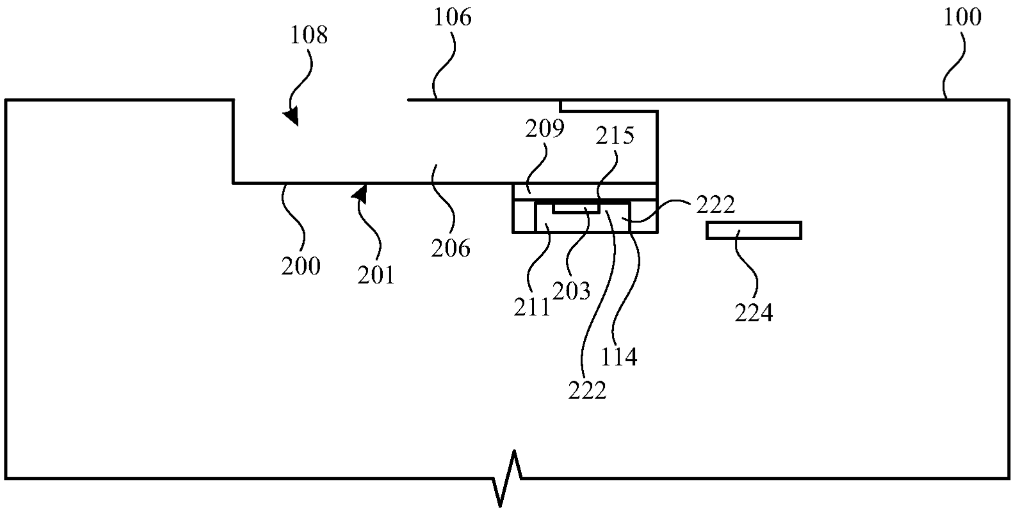
FIG. 2 illustrates a cross-sectional view of a portion of an example electronic device having a speaker in accordance with various aspects of the subject technology.

FIG. 2 illustrates a cross-sectional side view of a portion of the electronic device 100 including a speaker 114. In this example, the speaker 114 may include a front volume 209 and a back volume 211. The front volume 209 and the back volume 211 may be separated by a sound-generating component 215 (e.g., a diaphragm mounted to a voice coil, or an actuatable component of a microelectromechanical systems (MEMS) speaker). The front volume 209 may be fluidly and acoustically coupled (e.g., via an acoustic duct 206 in the example of FIG. 2) to the opening 108 in the housing 106. In one or more implementations, the acoustic duct 206 may be formed by a speaker housing 200 of a speaker module 201 in which the speaker 114 is disposed. In one or more other implementations, the acoustic duct 206 may be formed, entirely or in part, by one or more other device structures that guide sound generated by the speaker 114 through the opening 108 to the environment external to the housing 106. In one or more other implementations, the speaker 114 may be mounted directly adjacent and/or aligned with the opening 108 so that sound from the speaker 114 is directed through the opening with or without an acoustic duct 206 or other guiding structure. In the example of FIG. 2, the speaker 114 is spatially offset from the opening 108. However, in one or more others implementations, the speaker 114 may be aligned with the opening 108 (e.g., and fluidly and acoustically coupled to the opening 108 directly or via an acoustic duct). In one or more implementations, the speaker 114 may be a compact speaker having a cross-sectional area of less than, for example one thousand square millimeters ($mm^2$), six hundred $mm^2$, two hundred $mm^2$, less than one hundred $mm^2$, or less than fifty $mm^2$.

In the example of FIG. 2, the speaker 114 includes speaker circuitry 222. The speaker circuitry 222 may include, for example, a voice coil 203, a magnet, and/or other speaker hardware (e.g., one or more amplifiers, sensors, etc.). In one or more implementations, the electronic device 100 may also include other circuitry, such as device circuitry 224. Device circuitry 224 may include one or more processors, memory, acoustic components, haptic components, mechanical components, electronic components, or any other suitable components of an electronic device. In one or more implementations, the device circuitry 224 may also include one or more sensors, such as an inertial sensor (e.g., one or more accelerometers, gyroscopes, and/or magnetometers), a temperature sensor, a voltage sensor, a current sensor, a heart rate sensor, a blood oxygen sensor, a positioning sensor, a microphone, and/or the like. The speaker 114, the speaker housing 200, the sound-generating component 215, the speaker circuitry 222, and/or other portions and/or components of the electronic device 100 in the vicinity of the speaker 114 may include sensing circuitry configured to measure one or more physical characteristics of the speaker 114 and/or other components of the electronic device. For example, the speaker circuitry 222 may include a temperature sensor (e.g., a thermistor or other temperature sensing component) for sensing the temperature of the voice coil 203, a mechanical sensor (e.g., a strain gauge or optical sensor) for sensing an amount of displacement of the sound-generating component 215, a voltage sensor for sensing a voltage across one or more electrical elements of the speaker, and/or a current sensor for sensing and amount of current flowing through the speaker (e.g., through the voice coil 203).

The audio output of the speaker 114 may also affect the electrical characteristics of one or more electronic components of the electronic device 100. For example, audio outputs of the speaker 114, and/or mechanical operations for generating the audio outputs, may affect the resistance, impedance, capacitance, current, and/or other electrical characteristics of the speaker circuitry 222 (e.g., the voice coil 203) and/or of the device circuitry 224. The effect on the electrical characteristics on the speaker circuitry 222 (e.g., the voice coil 203) and/or of the device circuitry 224 may vary with varying frequencies and/or powers of the audio output, and/or with varying environmental conditions in which the electronic device 100 is operated. For this reason, the speaker circuitry 222 may measure one or more physical (e.g., electrical and/or mechanical) characteristics of one or more electronic components of the electronic device 100 (e.g., the speaker circuitry 222 and/or the device circuitry 224) during operation of the electronic component(s) and/or the speaker 114. These measured physical characteristics can provide information that can be used to make predictions of various aspects of the speaker 114 and/or the device circuitry 224 at various future times (e.g., given an audio signal to be output by the speaker).

In accordance with aspects of the subject disclosure, the measured electrical characteristics can be provided to a system modeler of the speaker circuitry 222. The system modeler can update a system model of the speaker 114, the speaker circuitry 222, the device circuitry 224, and/or other components and/or structures of the electronic device 100, and can provide updated model parameter to parallel prediction blocks, the predictions of which can be used for control of the speaker 114, as described in further detail herein.

Figure 3:
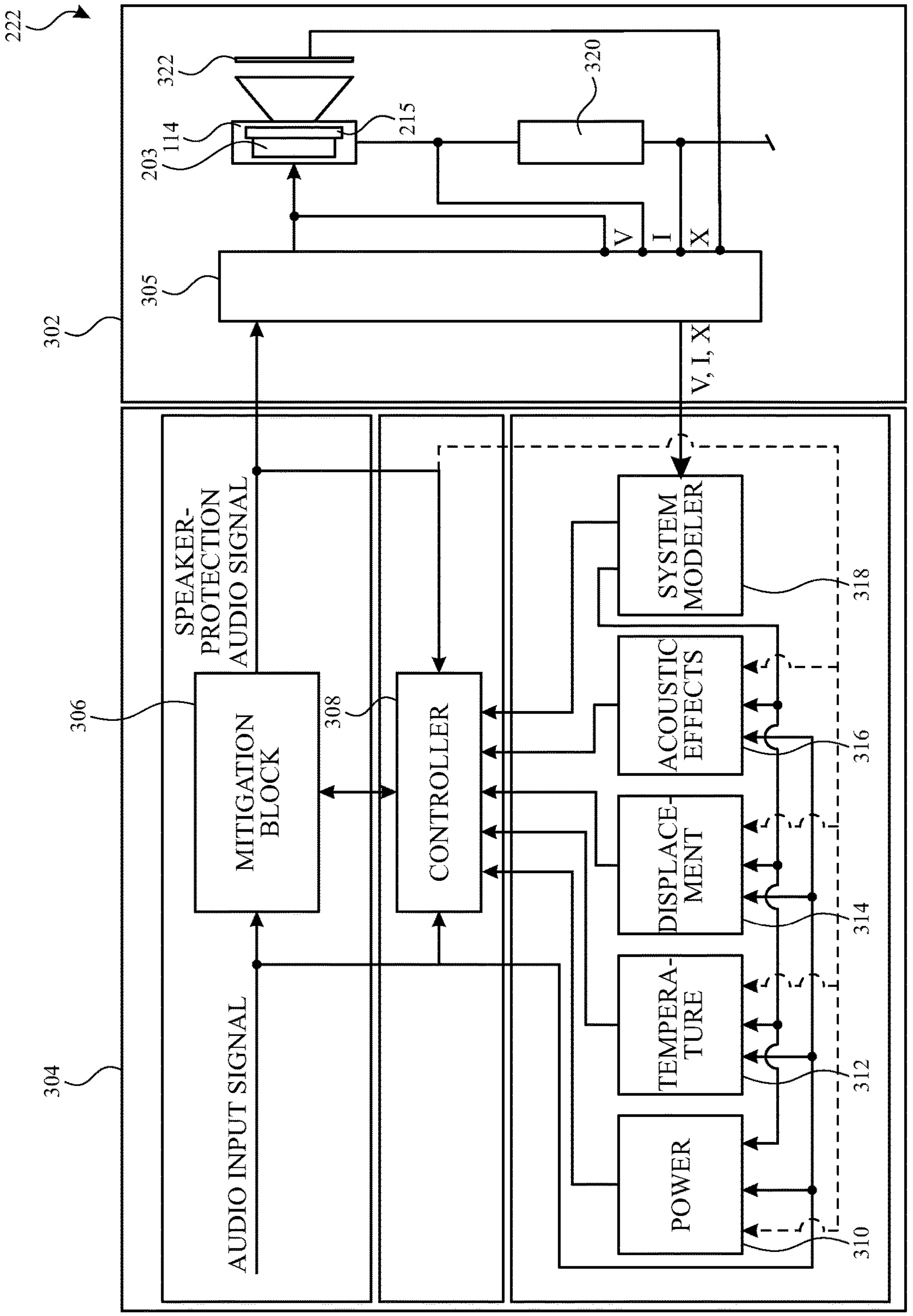
FIG. 3 illustrates a schematic diagram of an architecture for providing speaker control in accordance with various aspects of the subject technology.

FIG. 3 illustrates an example architecture for providing speaker control (e.g., with the electronic device 100). Various portions of the architecture of FIG. 3 can be implemented in software or hardware, including by one or more processors and a memory device containing instructions, which when executed by the processor cause the processor to perform the operations described herein. In some implementations, some of the elements of the architecture of FIG. 3 may be omitted and/or other elements may be included.

As shown in FIG. 3, the speaker circuitry 222 may include speaker hardware 302 and speaker control circuitry 304. For example, the speaker hardware 302 may include the speaker 114, and an amplifier 305 that drives the speaker 114 based on an audio output signal (e.g., a speaker-protection audio signal) received from the speaker control circuitry 304.

In accordance with aspects of the disclosure, the speaker control circuitry 304 generates the audio output signal based on an audio input signal. The audio input signal may be an audio signal that is received from processing circuitry of an electronic device (in which the speaker hardware 302 and the speaker control circuitry 304 are disposed (e.g., from device circuitry 224 of electronic device 100), or an audio signal that is received from a remote source such as another electronic device or a server. The speaker control circuitry 304 may modify the audio input signal to generate a speaker-protection audio signal that mitigates one or more effects (e.g., acoustically undesirable and/or damaging effects on the speaker hardware 302) that could occur if the speaker 114 were driven based on the (unmodified) audio input signal. For example, the audio input signal may be modified to limit or otherwise modify the power consumed by the speaker hardware, the temperature of the voice coil 203 of the speaker 114, the amount of displacement experienced by the sound-generating component 215, the current through the voice coil 203, and/or acoustic distortion or noise (e.g., buzzing or rattling) that may be generated by the speaker hardware 302.

As shown, the speaker control circuitry 304 may include a mitigation block 306 that modifies the audio input signal to generate the speaker-protection audio signal. In one or more implementations, the mitigation block 306 may be, for example, a parameterized processing block that operates using control parameters provided by a controller 308. For example, the control parameters may control aspects (e.g., frequency characteristics or other characteristics) of a parameterized filter for filtering the audio input signal. In some examples, the mitigation block 306 may be implemented as a dynamic equalizer. In other examples, the mitigation block may be implemented as a dynamic range controller or any other processing block configured to adjust the audio input signal based on input(s) from the controller 308. As shown in FIG. 3, the controller 308 may receive, as inputs, one or more outputs from one or more prediction blocks, and may determine control parameters for achieving the desired speaker control by the mitigation block 306. For example, as shown, the controller 308 may provide the determined control parameters to the mitigation block 306 to modify the audio input based on the control parameters.

As shown, speaker control circuitry 304 may include multiple parallel prediction blocks. In the example of FIG. 3, the prediction blocks include a power prediction block 310, a temperature prediction block 312, a displacement prediction block 314, and an acoustic effects prediction block 316 (as examples). As illustrated in FIG. 3, the parallel prediction blocks may all receive the same audio input signal substantially simultaneously. The parallel prediction blocks may also provide respective outputs to the controller 308 substantially simultaneously.

Each of the prediction blocks may include a model of a corresponding aspect of speaker operation. As example, the prediction blocks may include a speaker power consumption model for the power prediction block 310, a diaphragm displacement model for the displacement prediction block 314, a voice coil temperature model for the temperature prediction block 312, and/or an acoustic distortion model for the acoustic effects prediction block 316. In one or more implementations, the model in each prediction block may be configured to output a respective predicted future state of the corresponding aspect of the speaker operation, if the speaker were to be operated to output the audio input signal (e.g., unmodified) with the speaker and/or device in the current state (e.g., the current state indicated by a parameterized physical model provided from a system modeler 318, as discussed in further detail hereinafter).

In one or more other implementations, the model in each prediction block may be configured to output (e.g., without outputting a predicted future state) a mitigation request corresponding to a respective predicted future state of the corresponding aspect of the speaker operation. For example, the mitigation request may include a request to modify a portion of the audio input signal to prevent one or more speaker elements from contravening a threshold associated with those one or more speaker elements. For example, a mitigation request may be generated by a prediction block responsive to a determination that the threshold for a corresponding aspect of speaker operation would be contravened (e.g., exceeded, for an upper threshold, out-of-range for a threshold range) if the speaker were to be operated to output the audio input signal (e.g., unmodified) with the speaker and/or device in the current state (e.g., the current state indicated by a parameterized physical model provided from a system modeler 318).

In one or more implementations, the power prediction block 310 may predict power consumed by the speaker hardware 302 (e.g., the speaker 114 and the amplifier 305) if the speaker hardware 302 were to be operated in the current state based on the unmodified audio input signal and/or if the speaker hardware 302 were to be operated in one or more modified states based on one or more modified audio input signals. As shown, the power prediction block 310 may receive, as inputs, the audio input signal, and one or more system parameters provided from the system modeler 318 (e.g., and/or a feedback signal corresponding to the speaker-protection audio signal). The power prediction block 310 may generate one or more power prediction parameters based on the audio input signal and the one or more system parameters (e.g., and/or based on the feedback signal). As examples, the one or more power prediction parameters may include one or more predicted power consumption values that indicate the predicted power consumption of one or more components, such as the total predicted power consumption by the speaker circuitry 222, the speaker hardware 302, the amplifier 305, and/or the voice coil 203 in the current state of the device and based on the unmodified audio input signal, and/or one or more mitigation request parameters that identify requested modifications to the audio input signal to reduce or prevent the predicted power consumption that would occur without modification of the audio input signal.

In one or more implementations, the one or more system parameters that are received by the power prediction block 310 may be a subset of a set of parameters of a physical model of the speaker 114, the speaker hardware 302, and/or other features of an electronic device (e.g., electronic device 100) in which the speaker 114, the speaker hardware 302, and/or the speaker control circuitry 304 are disposed. For example, the parameterized physical model may be a parameterized physical model of at least the speaker 114 (e.g., a parameterized physical model of only the speaker 114, of the speaker 114 and the amplifier 305, of the speaker hardware 302, and/or of the speaker hardware 302 and/or one or more other components of the electronic device 100). The subset of the set of the parameters of the parameterized physical model may be a subset determined by the system modeler 318 (e.g., and/or pre-programmed into the system modeler 318) to be relevant to the power prediction operations of the power prediction block 310.

As another example, the temperature prediction block 312 may predict the temperature of one or more speaker components (e.g., the voice coil 203 and/or the amplifier 305) if the speaker hardware 302 were to be operated in the current state based on the unmodified audio input signal and/or if the speaker hardware 302 were to be operated in one or more modified states based on one or more modified audio input signals. As shown, the temperature prediction block 312 may receive, as inputs, the audio input signal, and one or more system parameters provided from the system modeler 318 (e.g., and/or a feedback signal corresponding to the speaker-protection audio signal). The temperature prediction block 312 may generate one or more temperature prediction parameters based on the audio input signal and the one or more system parameters (e.g., and/or the feedback signal). As examples, the one or more temperature prediction parameters may include one or more predicted temperatures of one or more components, such as a temperature of the voice coil 203 in the current state of the device and based on the unmodified audio input signal, and/or one or more mitigation request parameters that identify requested modifications to the audio input signal to reduce or prevent the predicted temperature(s) that would occur without modification of the audio input signal. In one or more implementations, the one or more system parameters that are received by the temperature prediction block 312 may be another subset (e.g., a different subset) of a set of parameters of the parameterized physical model generate by the system modeler 318. The subset of the set of the parameters of the parameterized physical model that are provided to the temperature prediction block 312 may be a subset determined by the system modeler 318 (e.g., and/or pre-programmed into the system modeler 318) to be relevant to the temperature prediction operations of the temperature prediction block 312. For example, the system modeler 318 may provide electrical parameters of the parameterized physical model to the temperature prediction block 312 without providing (e.g., some or all) mechanical parameters of the parameterized physical model to the temperature prediction block 312.

As another example, the displacement prediction block 314 may predict the displacement of the sound-generating component 215 if the speaker hardware 302 were to be operated in the current state based on the unmodified audio input signal and/or if the speaker hardware 302 were to be operated in one or more modified states based on one or more modified audio input signals (e.g., one or more estimated speaker-protection audio signals). As shown, the displacement prediction block 314 may receive, as inputs, the audio input signal, and one or more system parameters provided from the system modeler 318 (e.g., and/or a feedback signal corresponding to the speaker-protection audio signal). The displacement prediction block 314 may generate one or more displacement prediction parameters based on the audio input signal and the one or more system parameters (e.g., and/or based on the feedback signal). As examples, the one or more displacement prediction parameters may include one or more predicted displacements of one or more components, such as a predicted displacement of the sound-generating component 215 (e.g., a diaphragm) in the current state of the device and based on the unmodified audio input signal, and/or one or more mitigation request parameters that identify requested modifications to the audio input signal to reduce or prevent the predicted displacement(s) that would occur without modification of the audio input signal. In one or more implementations, the one or more system parameters that are received by the displacement prediction block 314 may be another subset (e.g., a different subset) of a set of parameters of the parameterized physical model generate by the system modeler 318. The subset of the set of the parameters of the parameterized physical model may be a subset determined by the system modeler 318 (e.g., and/or pre-programmed into the system modeler 318) to be relevant to the displacement prediction operations of the displacement prediction block 314. For example, the system modeler 318 may provide mechanical parameters of the parameterized physical model to the displacement prediction block 314 without providing (e.g., some or all) electrical parameters of the parameterized physical model to the displacement prediction block 314.

As another example, the acoustic effects prediction block 316 may predict one or more acoustic effects (e.g., noise effects and/or acoustic distortion effects) that may occur in the output of the speaker 114 if the speaker hardware 302 were to be operated in the current state based on the unmodified audio input signal and/or if the speaker hardware 302 were to be operated in one or more modified states based on one or more modified audio input signals. As shown, the acoustic effects prediction block 316 may receive, as inputs, the audio input signal, and one or more system parameters provided from the system modeler 318 (e.g., and/or a feedback signal corresponding to the speaker-protection audio signal). The acoustic effects prediction block 316 may generate one or more acoustic effect prediction parameters based on the audio input signal and the one or more system parameters (e.g., and/or based on the feedback). As examples, the one or more acoustic effect prediction parameters may include predicted levels of one or more acoustic distortions or noise sources associated with the speaker 114 and/or one or more other components of the speaker circuitry 222 in the current state of the device and based on the unmodified audio input signal, and/or a one or more mitigation request parameters that identify requested modifications to the audio input signal to reduce or prevent the predicted acoustic distortions or noise that would occur without modification of the audio input signal. In one or more implementations, the one or more system parameters that are received by the acoustic effects prediction block 316 may be another subset (e.g., a different subset) of a set of parameters of the parameterized physical model generate by the system modeler 318.

As illustrated in FIG. 3, the controller 308 may receive, as inputs, the outputs from the prediction blocks (e.g., from the power prediction block 310, the temperature prediction block 312, the displacement prediction block 314, and/or an acoustic effects prediction block 316). The controller may determine, based on the outputs of the prediction blocks, a set of (e.g., optimal) control parameters to achieve a desired speaker control in the mitigation block 306. In this example, the prediction blocks (e.g., the power prediction block 310, the temperature prediction block 312, the displacement prediction block 314, and/or an acoustic effects prediction block 316) process the audio input, in parallel, to generate predictions and send mitigation requests, in parallel (e.g., substantially simultaneously), to the single controller 308. The controller 308 may determine, from the various mitigation requests from the prediction blocks, a combined (e.g., optimal) instantaneous single mitigation for all areas of speaker control at once. As examples, the controller 308 may select one of the mitigation requests from among the various mitigation requests provided by the prediction blocks, or may combine two or more (e.g., all) of the mitigation requests from among the various mitigation requests provided by the prediction blocks to generate the single mitigation to be provided to the mitigation block 306. As examples, combining two or more mitigations may include using the two or more mitigations in the single mitigation if the two or more mitigations apply to different aspects of the audio signal (e.g., two volume mitigations at two different frequencies may both be included in a single overall volume mitigation), averaging (or computing a median or other statistical combination) two or more requested mitigations, interpolating between two or more requested mitigations, or otherwise combining the two or more mitigations.

In these examples, the controller 308 receives mitigation requests from the prediction blocks and determines a mitigation to apply based on the received mitigation requests. In one or more other implementations, the controller 308 may receive state predictions for various aspects of the speaker system from the various respective prediction blocks (e.g., without receiving mitigation requests from the prediction blocks) and may generate the single mitigation to apply, from the various state predictions in a joint mitigation determination operation. In one or more implementations, the controller 308 may be programmed to determine a mitigation deterministically (e.g., using a rules-based algorithm) based on the outputs of the parallel prediction blocks. In one or more other implementations, the controller 308 may be implemented using a machine-learning model. For example, in one or more implementations, various state predictions may be provided, as inputs, to a machine learning model and the mitigation may be obtained as a output of the machine learning model).

The controller 308 may then provide the single mitigation (e.g., implemented as a set of mitigation parameters), determined based on the combination of the predictions and/or mitigation requests from the prediction blocks, to the mitigation block 306. The mitigation block 306 may then modify the audio signal according to the controller-identified mitigation (e.g., by reducing the acoustic power in one or more frequency bins, reducing the overall volume of the audio output, or otherwise modifying the audio input signal according to the output of the controller 308, such as by applying a filter defined by the set of mitigation parameter provided by the controller 308).

In the example of FIG. 3, with a single mitigation (e.g., a single set of mitigation parameters) for all loudspeaker control areas (e.g., all areas for which a prediction block is provided), the speaker control processing becomes parallel, which can be advantageous in comparison with serialized loudspeaker control. For example, the parallel side-chain prediction models for each area of speaker control (e.g., power, diaphragm displacement, voice coil temperature, system induced distortion, etc.) that feed the single controller 308 can facilitate each area of speaker control sharing the same look-ahead delay, even in the case of multiple side-chain prediction blocks, which may reduce the overall processing delay for an audio input signal. Additionally, because the prediction blocks are provided with real time system parameters that are relevant to that prediction block (e.g., from the system modeler 318), the architecture of FIG. 3 can also facilitate a reduced control margin for the speaker hardware 302, which can allow the speaker hardware 302 to operate at its full capability in various device implementations and in various environmental and/or operating conditions.

In addition, the controller 308 can make corrections (e.g., based on a feedback signal including the speaker-correction audio signal from the mitigation block 306) to the audio signal through applied signal processing to minimize effects of power compression and loss of acoustic sensitivity of the physical loudspeaker system. As discussed herein, in one or more implementations, the speaker-protection audio signal that is output of the mitigation block 306 may also be provided, as feedback, to the prediction blocks (e.g., the power prediction block 310, the temperature prediction block 312, the displacement prediction block 314, and/or an acoustic effects prediction block 316), and the prediction blocks can provide improved prediction parameters (e.g., improved state predictions and/or mitigation requests) using the feedback audio output signal.

As illustrated in FIG. 3, the system modeler 318 may receive measurements, from the speaker hardware 302, of physical system characteristics, such as a voltage (V), a current (I), and/or a displacement or mechanical motion (X), such as diaphragm displacement. For example, the voltage may be a voltage across one or more components of the speaker hardware 302, such as a voltage difference across the voice coil 203. As an example, the current may be a current flowing through the voice coil 203. For example, the current may be measured by a sense resistor 320 electrically coupled between the speaker 114 and the amplifier 305. As an example, the displacement or mechanical motion may include a distance between a current location of the sound-generating component 215 and a stable point or resting point of the sound-generating component 215. For example, the displacement or mechanical motion may be measured by a sensor 322 (e.g., a capacitive sensor, an optical sensor, or other sensor for measuring mechanical motion and/or displacement of a diaphragm or other sound-generating component of a speaker). From these physical characteristics, the system modeler 318 may estimate the state of the speaker circuitry 222, the speaker hardware 302, and/or other electrical and/or mechanical components of the electronic device 100 (e.g., and/or the overall state of the electronic device 100).

Estimating the state may include fitting, by the system modeler 318, one or more adjustable parameters of a predefined physical model of the electronic device 100 or a portion thereof (e.g., a predefined model of the speaker circuitry 222 and/or the speaker hardware 302) to the measured physical characteristics (e.g., the measured voltage, current, and/or displacement or mechanical motion and/or one or more physical characteristics derived therefrom or measured separately therefrom such as an impedance). The system modeler 318 may then extract one or more subsets of system model parameters for publication or distribution to the predictor models (e.g., the power prediction block 310, the temperature prediction block 312, the displacement prediction block 314, and/or an acoustic effects prediction block 316). For example, in one or more implementations, the system modeler 318 generates a full set of parameters that describe the state of the electronic device 100 and/or the speaker circuitry 222 (e.g., the speaker hardware 302), and then distributes, to each of the prediction blocks (e.g., the power prediction block 310, the temperature prediction block 312, the displacement prediction block 314, and/or an acoustic effects prediction block 316), a particular subset of the full set of parameters that are relevant to that prediction block.

In one or more implementations, parameters of the predetermined system model may be fit to the measured physical characteristics (e.g., the voltage, V, the current, I, and/or the displacement or mechanical motion, X), and/or other measured physical characteristics. In one or more implementations, a confidence in the fit may be determined by the system modeler 318. In one or more implementations, one or more of the fitted parameters may be provided to the respective prediction blocks upon determining that the confidence in the fit meets a confidence threshold.

In one or more implementations, the parameterized physical model may be a complex model that includes parameters that are fit to both the magnitude of a measured physical characteristic and a phase of that measured physical characteristic. In various implementations, the parameters of the parameterized physical model may, for a given instant in time, be single valued parameters or may be frequency-dependent parameters. In one or more implementations, all of the parameters of the parameterized physical model may be fit using all of the measured physical characteristics. In one or more other implementations, some parameters, such as mechanical parameters, may be fit to a first set of the measured physical characteristics, and other parameters, such as acoustic parameters and/or electrical parameters, may be fit to a second set of the measured physical characteristics.

System modeling operations using the physical characteristics (e.g., the voltage, current, and/or displacement or mechanical motion) measured during operation of the electronic device 100 (e.g., including during operation of the speaker hardware 302 to output sound using the speaker 114 responsive to the audio output signal), allows the system modeler 318 to model the instantaneous state of the physical speaker system (e.g., and/or other components or elements of the electronic device 100) in real time. The distribution, to the prediction blocks, of the modeled parameters resulting from this real time modeling of the instantaneous state by the system modeler 318, allows the speaker control circuitry 304 to modify the audio input signal to account for time variations of the physical speaker system (e.g., due to power compression and loss of acoustic sensitivity, etc.) as well as to account for manufacturing process variations from device to device. In this way, the system modeler 318 provides the prediction blocks with identified model parameters for that predictor, and through resulting improved model predictions by the prediction blocks, the controller 308 can safely reduce margins to allow the speaker hardware 302 to operate to its full capacity in various devices and in various operating conditions and/or environments.

Figure 4:
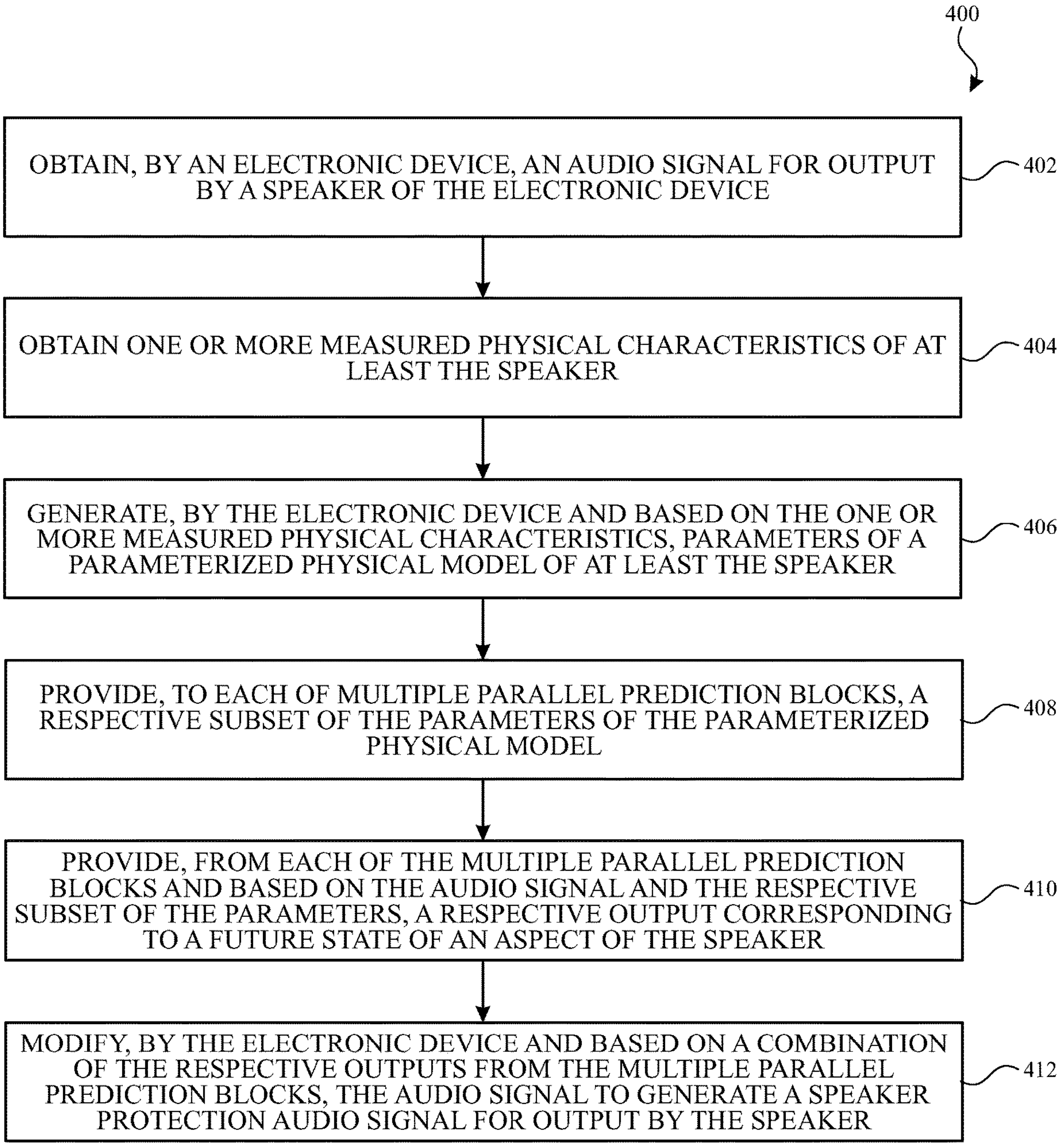
FIG. 4 illustrates a flow chart of illustrative operations that may be performed for speaker control in accordance with various aspects of the subject technology.

FIG. 4 illustrates a flow diagram of an example process for speaker control, in accordance with one or more implementations. For explanatory purposes, the process 400 is primarily described herein with reference to the electronic device 100 and the speaker 114 of FIGS. 1 and 2. However, the process 400 is not limited to the electronic device 100 and the speaker 114 of FIGS. 1 and 2, and one or more blocks (or operations) of the process 400 may be performed by one or more other components and other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

In the example of FIG. 4, at block 402, an electronic device (e.g., electronic device 100) may obtain an audio signal to be output by a speaker of the electronic device. As examples, the audio signal may be generated by the electronic device, or received from a remote device or a server. The audio signal may be generated by a microphone of the electronic device, may correspond to a voice of a person participating (e.g., from a remote device) in a call or audio and/or video conference with the electronic device 100, may be audio content corresponding to music, a movie, a podcast or other media content, or may be or include any other audio signal configured to cause a speaker to generate corresponding sound.

At block 404, one or more measured physical characteristics of at least the speaker may be obtained (e.g., by the electronic device). For example, the one or more measured physical characteristics may be obtained during operation of an electronic component and/or the speaker of the electronic device. As examples, the one or more measured physical characteristics may include one or more of a voltage, a current, a resistance, an impedance, or a mechanical motion or displacement. As an example, the one or more measured physical characteristics may include one or more measured physical characteristics of an electronic component, which may include a component (e.g., speaker circuitry 222 or a component thereof) of the speaker (e.g., speaker 114) of the electronic device, such as a voice coil (e.g., voice coil 203) of the speaker (e.g., and/or any other speaker circuitry that receives mechanical and/or acoustic feedback when the speaker is operating to generating audio output). The one or more measured physical characteristics may be determined during operation of the electronic component while and/or as part of operating the speaker of the electronic device. As another example, the electronic component may be a component (e.g., device circuitry 224) of the electronic device that is separate from the speaker and that receives mechanical and/or acoustic feedback when the speaker is operating to generating audio output. In one or more implementations, the one or more measured physical characteristics include one or more of a voltage, a current, and a diaphragm displacement associated with the speaker.

At block 406, the electronic device (e.g., the system modeler 318 of the speaker control circuitry 304 of the speaker circuitry 222) may generate, based on the one or more measured physical characteristics, parameters of a parameterized physical model of at least the speaker (e.g., a parameterized physical model of the speaker 114, or the speaker 114 and the amplifier 305, of the speaker hardware 302, and/or of one or more components of an electronic device in which the speaker is implemented). For example, generating the parameters of the parameterized physical model may include adjusting an initial set of parameters of the parameterized physical model based until the parameterized physical model fits (e.g., within a confidence threshold) the one or more measured physical characteristics. In one or more implementations, the parameterized physical model may be a parameterized physical model of the one or more physical characteristics of a speaker system (e.g., the speaker hardware 302 of FIG. 3), and adjusting the model may include adjusting one or more parameters of the model to fit the one or more measured physical characteristics (e.g., as described herein in connection with FIG. 3).

At block 408, the electronic device (e.g., the system modeler 318) may provide, to each of multiple parallel prediction blocks a respective subset of the parameters of the parameterized physical model. For example, the multiple parallel prediction blocks may include two or more of a power prediction block (e.g., the power prediction block 310), a voice coil temperature prediction block (e.g., the temperature prediction block 312), a diaphragm displacement prediction block (e.g., the displacement prediction block 314), and a system induced distortion prediction block (e.g., the acoustic effects prediction block 316), a respective subset of the parameters of the parameterized physical model. In one or more implementations, each of the multiple parallel prediction blocks may be provided with a subset of the parameters that is different from the subset that is provided to one or more others of the multiple parallel prediction blocks.

At block 410, the electronic device may provide, from each of the multiple parallel prediction blocks and based on the audio signal and the respective subset of the parameters, a respective output corresponding to a respective prediction for a future state of an aspect of the speaker. For example, providing the respective output from each of the multiple parallel prediction blocks may include providing the respective output from each of the multiple parallel prediction blocks, in parallel, to a single controller (e.g., the controller 308). In one or more implementations, for each of the multiple parallel prediction blocks, the respective output corresponding to the respective prediction for the future state of the aspect of the speaker may include the respective prediction for the future state of the aspect of the speaker by that prediction block. In one or more implementations, for each of the multiple parallel prediction blocks, the respective output corresponding to the respective prediction for the future state of the aspect of the speaker may include a respective mitigation request for mitigating at least a portion of the audio signal to protect the corresponding aspect of the speaker in the future state. For example, a mitigation request from a prediction block may include a request to modify a portion of the audio signal in a way that the prediction block predicts will prevent the audio signal from contravening a threshold corresponding to the aspect of the speaker.

At block 412, the electronic device (e.g., the controller 308 and/or the mitigation block 306) may modify, based on a combination of the respective outputs from the multiple parallel prediction blocks, the audio signal to generate a speaker-protection audio signal for output by the speaker. In one or more implementations, modifying the audio signal to generate the speaker-protection audio signal for output by the speaker may include generating, by the single controller and based on the combination of the respective outputs from the multiple parallel prediction blocks, control parameters for a mitigation block (e.g., a parameterized processing block implemented by the mitigation block 306), providing the control parameters from the single controller to the mitigation block, and/or applying the mitigation block with the control parameters to the audio signal to generate the speaker-protection audio signal. In various implementations, the combination of the respective outputs may include selection of one or more of the respective outputs, a concatenation of two or more of the respective outputs, an average, median, or other statistical combination of the two or more of the respective outputs, an interpolation between two or more of the respective outputs, or another suitable combination of the respective outputs. In one or more implementations in which the outputs from the multiple parallel prediction blocks include state predictions, the controller may determine the modification for the audio signal by providing the outputs from the multiple parallel prediction blocks to a machine learning model that is trained to generate audio signal modification parameters responsive to receiving state predictions, and obtaining the modification as an output of the machine learning model.

In one or more implementations, the process 400 may also include outputting the speaker-protection audio signal at an output time that is later than a time associated with obtaining the audio signal by a single lookahead delay time for all of the multiple parallel prediction blocks. For example, each of the multiple parallel prediction blocks may receive the audio signal and the respective subset of the parameters of the parameterized physical model (e.g., and a feedback signal), and generate the respective prediction, in parallel, within a time period that is less than the single lookahead delay time. In one or more implementations, the output, by the speaker, of the speaker-protection audio signal may be delayed by the single lookahead delay time to allow the multiple parallel prediction blocks to generate predictions and to allow the electronic device (e.g., the controller 308 and the mitigation block 306) to modify the audio signal so that the speaker-protection audio signal can be output instead of the obtained audio (input) signal.

In one or more implementations, the speaker-protection audio signal may be provided as feedback to one or more of the multiple parallel prediction blocks. For example, the prediction blocks may use to the feedback to update an output of the prediction block. In one or more implementations, the speaker-protection audio signal may be provided as feedback to the single controller.

Figure 5:
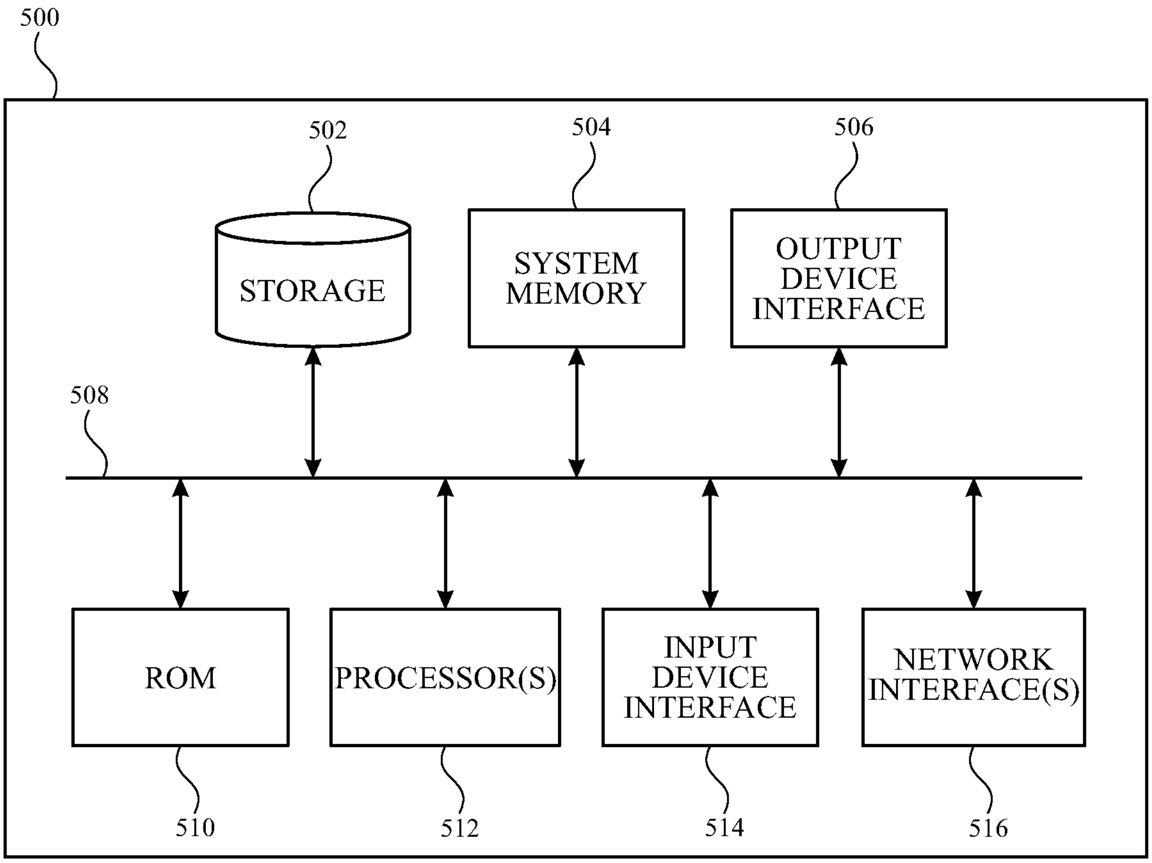
FIG. 5 illustrates an electronic system with which one or more implementations of the subject technology may be implemented.

FIG. 5 illustrates an electronic system 500 with which one or more implementations of the subject technology may be implemented. The electronic system 500 can be, and/or can be a part of, one or more of the electronic device 100 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, microphones, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

In accordance with some aspects of the subject disclosure, a method is provided that includes obtaining, by an electronic device, an audio signal for output by a speaker of the electronic device; obtaining one or more measured physical characteristics of at least the speaker; generating, by the electronic device and based on the one or more measured physical characteristics, parameters of a parameterized physical model of at least the speaker; providing, to each of multiple parallel prediction blocks, a respective subset of the parameters of the parameterized physical model; providing, from each of the multiple parallel prediction blocks and based on the audio signal and the respective subset of the parameters, a respective output corresponding to a respective prediction for a future state of an aspect of the speaker; and modifying, by the electronic device and based on a combination of the respective outputs from the multiple parallel prediction blocks, the audio signal to generate a speaker-protection audio signal for output by the speaker.

In accordance with other aspects of the subject disclosure, an electronic device is provided that includes a speaker and speaker control circuitry, the speaker control circuitry configured to: obtain an audio signal for output by the speaker; obtain one or more measured physical characteristics of at least the speaker; generate, based on the one or more measured physical characteristics, parameters of a parameterized physical model of at least the speaker; provide, to each of multiple parallel prediction blocks, a respective subset of the parameters of the parameterized physical model; provide, from each of the multiple parallel prediction blocks and based on the audio signal and the respective subset of the parameters, a respective output corresponding to a respective prediction for a future state of an aspect of the speaker; and modify, based on a combination of the respective outputs from the multiple parallel prediction blocks, the audio signal to generate a speaker-protection audio signal for output by the speaker.

In accordance with other aspects of the subject disclosure, a non-transitory machine-readable medium is provided, storing instructions which, when executed by one or more processors, cause the one or more processors to perform operations that include: obtaining an audio signal for output by a speaker; obtaining one or more measured physical characteristics of at least the speaker; generating, based on the one or more measured physical characteristics, parameters of a parameterized physical model of at least the speaker; providing, to each of multiple parallel prediction blocks, a respective subset of the parameters of the parameterized physical model; providing, from each of the multiple parallel prediction blocks and based on the audio signal and the respective subset of the parameters, a respective output corresponding to a respective prediction for a future state of an aspect of the speaker; and modifying, based on a combination of the respective outputs from the multiple parallel prediction blocks, the audio signal to generate a speaker-protection audio signal for output by the speaker.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms “computer”, “processor”, and “memory” all refer to electronic or other technological devices. These terms exclude people or groups of people. For the purposes of the specification, the terms “display” or “displaying” means displaying on an electronic device. As used in this specification and any claims of this application, the terms “computer readable medium” and “computer readable media” are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term “software” is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising:

obtaining, by speaker control circuitry of an electronic device, an audio signal for output by a speaker of the electronic device, wherein the speaker control circuitry comprises a single controller;

obtaining one or more measured physical characteristics of at least the speaker;

generating, by the electronic device and based on the one or more measured physical characteristics, parameters of a parameterized physical model of at least the speaker;

providing, to each of multiple parallel prediction blocks, a respective subset of the parameters of the parameterized physical model;

providing, from each of the multiple parallel prediction blocks and based on the audio signal and the respective subset of the parameters, a respective output corresponding to a respective prediction for a future state of an aspect of the speaker;

modifying, by the electronic device and based on a combination of the respective outputs from the multiple parallel prediction blocks, the audio signal to generate a speaker-protection audio signal for output by the speaker, at least in part by:

generating, by the single controller and based on the combination of the respective outputs from the multiple parallel prediction blocks, control parameters for a mitigation block;

providing the control parameters from the single controller to the mitigation block; and applying the mitigation block with the control parameters to the audio signal to generate the speaker-protection audio signal; and providing the speaker-protection audio signal as feedback to one or more of the multiple parallel prediction blocks.

2. The method of claim 1, wherein the one or more measured physical characteristics include one or more of a voltage, a current, and a diaphragm displacement associated with the speaker.

3. The method of claim 1, further comprising outputting the speaker-protection audio signal at an output time that is later than a time associated with obtaining the audio signal by single lookahead delay time for all of the multiple parallel prediction blocks.

4. The method of claim 1, wherein providing the respective output from each of the multiple parallel prediction blocks comprises providing the respective output from each of the multiple parallel prediction blocks, in parallel, to the single controller.

5. The method of claim 1, wherein the multiple parallel prediction blocks include two or more of a power prediction block, a voice coil temperature prediction block, a diaphragm displacement prediction block, and a system induced distortion prediction block.

6. The method of claim 1, wherein, for each of the multiple parallel prediction blocks, the respective output corresponding to the respective prediction for the future state of the aspect of the speaker comprises the respective prediction for the future state of the aspect of the speaker.

7. The method of claim 1, wherein, for each of the multiple parallel prediction blocks, the respective output corresponding to the respective prediction for the future state of the aspect of the speaker comprises a respective mitigation request for mitigating at least a portion of the audio signal to protect the aspect of the speaker in the future state.

8. The method of claim 1, wherein generating the parameters of the parameterized physical model of at least the speaker comprises generating the parameters of the parameterized physical model based on both of a magnitude and a phase of the one or more measured physical characteristics.

9. The method of claim 8, wherein generating the parameters of the parameterized physical model based on both of the magnitude and the phase of the one or more measured physical characteristics comprises fitting at least one of the parameters to both of the magnitude and the phase.

10. An electronic device, comprising:

a speaker; and speaker control circuitry comprising a single controller, the speaker control circuitry configured to:

obtain an audio signal for output by the speaker;

obtain one or more measured physical characteristics of at least the speaker;

generate, based on the one or more measured physical characteristics, parameters of a parameterized physical model of at least the speaker;

provide, to each of multiple parallel prediction blocks, a respective subset of the parameters of the parameterized physical model;

provide, from each of the multiple parallel prediction blocks and based on the audio signal and the respective subset of the parameters, a respective output corresponding to a respective prediction for a future state of an aspect of the speaker;

modify, based on a combination of the respective outputs from the multiple parallel prediction blocks, the audio signal to generate a speaker-protection audio signal for output by the speaker, at least in part by:

generating, by the single controller and based on the combination of the respective outputs from the multiple parallel prediction blocks, control parameters for a mitigation block;

providing the control parameters from the single controller to the mitigation block; and applying the mitigation block with the control parameters to the audio signal to generate the speaker-protection audio signal; and provide the speaker-protection audio signal as feedback to one or more of the multiple parallel prediction blocks.

11. The electronic device of claim 10, wherein the one or more measured physical characteristics include one or more of a voltage, a current, and a diaphragm displacement associated with the speaker.

12. The electronic device of claim 10, wherein the speaker control circuitry is further configured to output the speaker-protection audio signal at an output time that is later than a time associated with obtaining the audio signal by single lookahead delay time for all of the multiple parallel prediction blocks.

13. The electronic device of claim 10, wherein the speaker control circuitry is configured to provide the respective output from each of the multiple parallel prediction blocks by providing the respective output from each of the multiple parallel prediction blocks, in parallel, to the single controller.

14. The electronic device of claim 10, wherein the multiple parallel prediction blocks include two or more of a power prediction block, a voice coil temperature prediction block, a diaphragm displacement prediction block, and a system induced distortion prediction block.

15. A non-transitory machine-readable medium storing instructions which, when executed by one or more processors, cause the one or more processors to perform operations comprising:

obtaining, by speaker control circuitry, an audio signal for output by a speaker, wherein the speaker control circuitry comprises a single controller;

obtaining one or more measured physical characteristics of at least the speaker;

generating, based on the one or more measured physical characteristics, parameters of a parameterized physical model of at least the speaker;

providing, to each of multiple parallel prediction blocks, a respective subset of the parameters of the parameterized physical model;

providing, from each of the multiple parallel prediction blocks and based on the audio signal and the respective subset of the parameters, a respective output corresponding to a respective prediction for a future state of an aspect of the speaker;

modifying, based on a combination of the respective outputs from the multiple parallel prediction blocks, the audio signal to generate a speaker-protection audio signal for output by the speaker, at least in part by:

generating, by the single controller and based on the combination of the respective outputs from the multiple parallel prediction blocks, control parameters for a mitigation block;

providing the control parameters from the single controller to the mitigation block; and applying the mitigation block with the control parameters to the audio signal to generate the speaker-protection audio signal; and providing the speaker-protection audio signal as feedback to one or more of the multiple parallel prediction blocks.

16. The non-transitory machine-readable medium of claim 15, wherein the one or more measured physical characteristics include one or more of a voltage, a current, and a displacement associated with the speaker.

17. The non-transitory machine-readable medium of claim 15, the operations further comprising outputting the speaker-protection audio signal at an output time that is later than a time associated with obtaining the audio signal by single lookahead delay time for all of the multiple parallel prediction blocks.

18. The non-transitory machine-readable medium of claim 15, wherein the multiple parallel prediction blocks include two or more of a power prediction block, a voice coil temperature prediction block, a diaphragm displacement prediction block, and a system induced distortion prediction block.

19. The non-transitory machine-readable medium of claim 15, wherein, for each of the multiple parallel prediction blocks, the respective output corresponding to the respective prediction for the future state of the aspect of the speaker comprises a respective mitigation request for mitigating at least a portion of the audio signal to protect the aspect of the speaker in the future state.

* * * * *